(12) United States Patent
Stuckey

(10) Patent No.: US 9,422,019 B2
(45) Date of Patent: Aug. 23, 2016

(54) PNEUMATIC CUSHION WITH VARIABLE CONFIGURATION AND CONSTRICTION

(71) Applicant: Robert J. Stuckey, St Peters, MO (US)

(72) Inventor: Robert J. Stuckey, St Peters, MO (US)

( * ) Notice: Subject to any disclaimer, the term of this patent is extended or adjusted under 35 U.S.C. 154(b) by 0 days.

(21) Appl. No.: 14/195,230

(22) Filed: Mar. 3, 2014

(65) Prior Publication Data

US 2014/0300150 A1 Oct. 9, 2014

Related U.S. Application Data

(60) Provisional application No. 61/790,844, filed on Mar. 15, 2013.

(51) Int. Cl.
*B62J 1/10* (2006.01)
*B62J 1/00* (2006.01)
*B62J 1/26* (2006.01)

(52) U.S. Cl.
CPC .. *B62J 1/10* (2013.01); *B62J 1/005* (2013.01); *B62J 1/007* (2013.01); *B62J 1/26* (2013.01)

(58) Field of Classification Search
CPC ............... B62J 1/005; B62J 1/26; B62J 1/10; B62J 1/007
USPC ................................ 297/199, 200; 5/654, 657
See application file for complete search history.

(56) References Cited

U.S. PATENT DOCUMENTS

| 467,352 | A | * | 1/1892 | Deardorff et al. ............. 297/199 |
|---|---|---|---|---|
| 471,908 | A | | 3/1892 | Steers |
| 566,344 | A | * | 8/1896 | Sager ............................ 297/200 |
| 608,857 | A | | 8/1898 | Hildreth |
| 611,377 | A | | 9/1898 | Davis |
| 623,238 | A | * | 4/1899 | Davis ............................ 297/200 |
| 2,216,818 | A | | 10/1940 | Kuhlman |
| 4,504,089 | A | | 3/1985 | Calvert et al. |
| 4,611,851 | A | | 9/1986 | Noyes et al. |
| 5,070,558 | A | * | 12/1991 | Fenley .............................. 5/636 |
| 5,074,618 | A | | 12/1991 | Ballard |
| 5,191,665 | A | | 3/1993 | Breedlove |
| 5,244,251 | A | | 9/1993 | Bourla |
| 5,280,993 | A | | 1/1994 | Hsh |
| 5,318,344 | A | | 6/1994 | Wang |
| 5,419,612 | A | | 5/1995 | Rassekhi |
| 5,524,961 | A | | 6/1996 | Howard |
| 5,558,395 | A | | 9/1996 | Huang |
| 5,634,685 | A | | 6/1997 | Herring |
| 5,636,896 | A | | 6/1997 | Howard |
| 5,937,462 | A | | 8/1999 | Huang |

(Continued)

*Primary Examiner* — Anthony D Barfield
(74) *Attorney, Agent, or Firm* — Dennis JM Donahue, III; CreatiVenture Law, LLC

(57) ABSTRACT

A bladder formed inside or positioned on a seat accounts for variations in personal anatomy with changes in the configurations of multiple chambers in the bladder and may also allow for changes to the constriction between the chambers in the bladder. The bladder forms a cushioning device that is used for seating applications which involve movement and continuously changes softness between the chambers by using the movement of the rider. Rider movement results in the interchange of pressures through variable-sized orifices between variable-displacement chambers. The number and size of the chambers can be varied according to a desired seating configuration. The orifice size can be changed with a variable constriction mechanism. Different fastening configurations can change the number and shape of the chambers. The cushioning device can be used in retrofitting existing seats and can be produced in new seats.

17 Claims, 4 Drawing Sheets

(56) References Cited

U.S. PATENT DOCUMENTS

| | | |
|---|---|---|
| 5,938,277 A | 8/1999 | Rioux |
| 6,012,772 A | 1/2000 | Conde |
| 6,135,550 A | 10/2000 | Tucho |
| 6,141,807 A * | 11/2000 | Tapper ................ 5/653 |
| 6,152,524 A | 11/2000 | Cox |
| D440,061 S | 4/2001 | Conde |
| 6,260,919 B1 | 7/2001 | Yates |
| 6,305,743 B1 | 10/2001 | Wheeler |
| 6,390,548 B1 | 5/2002 | Cole |
| 6,761,400 B2 | 7/2004 | Hobson |
| 6,807,697 B2 * | 10/2004 | Druery et al. ............ 5/650 |
| 6,829,799 B2 | 12/2004 | Kuhn |
| 6,860,552 B1 | 3/2005 | Bigolin |
| 6,886,202 B2 | 5/2005 | Frechette |
| 7,140,057 B2 * | 11/2006 | Hetzel et al. ............ 5/653 |
| 7,448,676 B2 | 11/2008 | Wyner |
| 7,587,773 B2 * | 9/2009 | Littlehorn et al. ........ 5/655 |
| 7,648,198 B1 * | 1/2010 | Matsler ................ 297/200 |
| D625,370 S | 10/2010 | Huber |
| 7,828,378 B2 | 11/2010 | Donaghey |
| 8,708,414 B2 * | 4/2014 | Hurwitz ............... 297/393 |
| 2001/0045765 A1 | 11/2001 | Nelson |
| 2003/0234565 A1 | 12/2003 | McCurdy |
| 2008/0271249 A1 * | 11/2008 | Deetsch ................ 5/640 |
| 2011/0237403 A1 | 9/2011 | Huber |

* cited by examiner

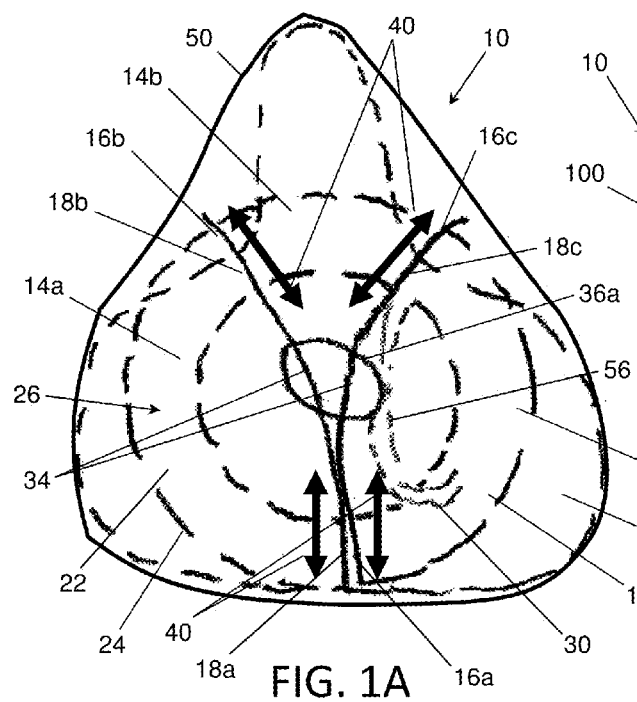
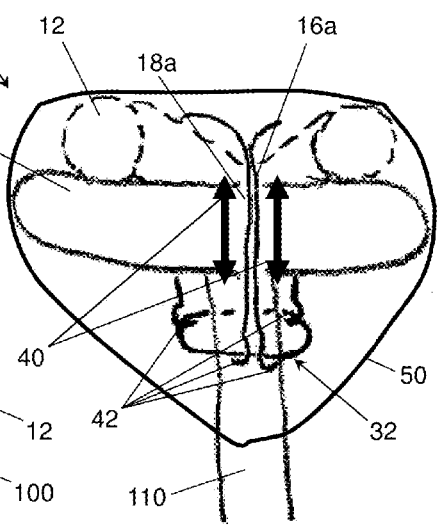
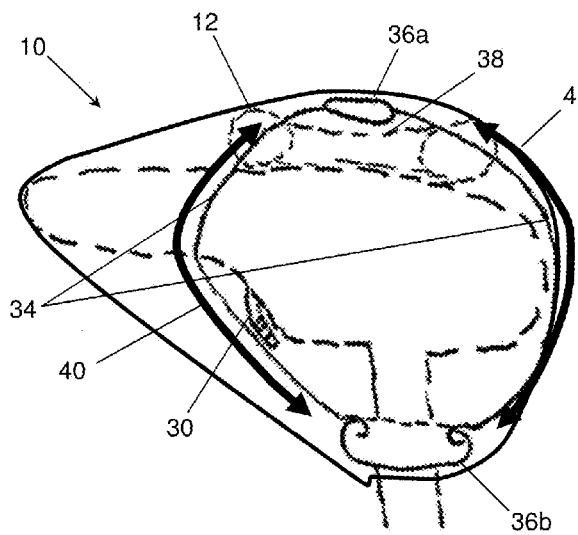
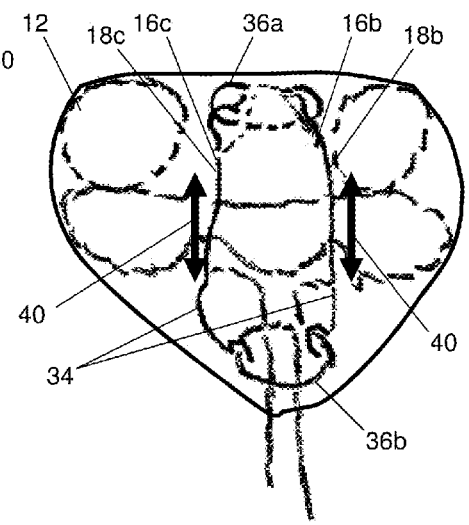
FIG. 1A
FIG. 1C
FIG. 1B
FIG. 1D

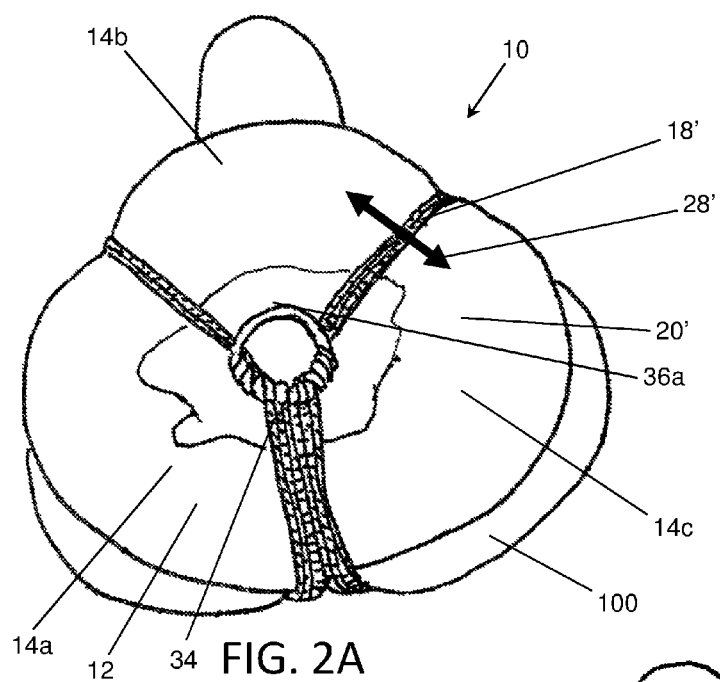
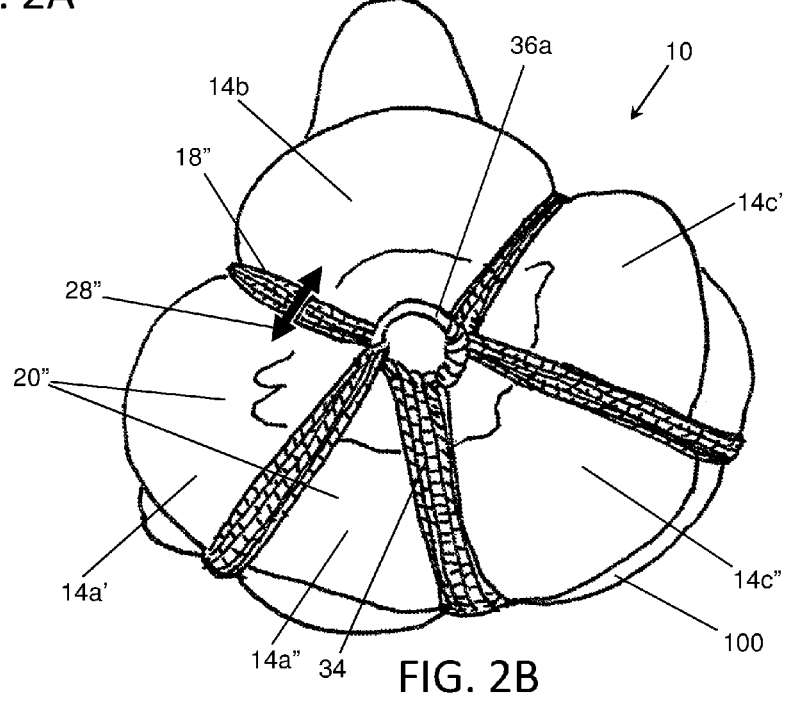

PNEUMATIC CUSHION WITH VARIABLE CONFIGURATION AND CONSTRICTION

CROSS-REFERENCE TO RELATED APPLICATIONS

This application claims priority from U.S. Provisional Patent Application Ser. No. 61/790,844 filed on Mar. 15, 2013 which is hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to pneumatic cushions and other fluid-filled cushions, and more particularly to a pneumatic cushion having a variable configuration with multiple chambers and a variable constriction of the flow between the chambers.

2. Related Art

Since the invention of the bicycle, the enjoyable activity of bicycle riding can become painful for both the buttocks and genitalia areas. Even before the invention of the bicycle, mankind looked for ways to comfortably support themselves during riding activities; the invention of the saddle is said to have occurred more than 3,000 years ago. The 'pain-in-the-butt' problem has been tackled with many different technologies over this lengthy period of time and has included leather, textile padding, springs, foam and gel cushions, and inflatable bladders. Problems with these technologies are widely varied (e.g., too costly to manufacture; too complicated to execute manufacturing & marketing; advertised benefits not easily achieved or realized; price points too expensive relative to competing products), but the one common occurrence is that they are mass-produced and not truly personalized to the individual's comfort requirements. Attempts to solve the problem boil down to a maxim that personalized comfort cannot be mass produced.

Since personalized comfort continues to be sought and inflatable bladders conform to a user, there are many styles of inflatable cushions for various types of seats, particularly including bicycle seats. However, most inflatable cushions provide one or more bladders that are in a fixed configuration even though the location of riders' ischium and pubic bones can vary dramatically based on the rider's size, gender and a number of other factors. Additionally, even when these fixed configuration bladders have multiple chambers that try to support a range of sizes and allow for the communication of the airflow, they do not have any variation in the constriction between the chambers. This lack of constriction may be important, particularly with bladders in a fixed configuration because a variation in the constriction could help provide more personalized comfort based on the particular rider's size, gender or some other factor (i.e., no variable valves or other mechanisms between the chambers).

It is already known to use a multi-chamber bladder with an extension tube that allows for airflow between the chambers and that also allows the chambers to be placed in various alternative configurations relative to each other, such as described in U.S. Pat. No. 5,558,395. However, merely permitting chambers to have different distances between them is not a solution to the problem of personalized comfort. There remains the issue of how much pressure should be in the chambers and what should be the flow rate of fluid between the chambers. For example, consider the possibility that there is sufficient pressure in two adjacent chambers in fluid communication with each other when a rider is in a steady state posture, such as when the rider is coasting, but if there is not enough constriction in the passageway(s) between the chambers when the rider is in a dynamic riding mode, the side that needs to provide support (which changes from one side to the other with the pedaling action of the rider) may merely collapse under the increased pressure of the rider and not provide the required support.

Additionally, when it comes to the particular use of the multi-chamber bladder design for bicycle seats, such as in U.S. Pat. No. 5,558,395, the extension tube is described as being useful for locating a release valve at an adjustable distance from the cushion, and there is no consideration given to the rate of the airflow between the cushions for the dynamic mode of operation. Another multi-chamber bladder may have two entirely separate bladders, each with its own filling valve and with no air passage between the bladders such as in U.S. Pat. No. 6,305,743. Other multi-chamber bladder designs have upper and lower bladders, such as in U.S. Pat. Nos. 608,857 and 611,377. The '377 Patent describes a valve mechanism between the bladders which can allow the downward flow of the air from the upper bladder to the lower bladder to pass more quickly than the return of the air from the lower bladder to the upper bladder. However, there is no allowance for the user to regulate the valve mechanism or otherwise vary the rate of flow between the bladders nor is there any ability for the user to change the configuration of the bladders.

It is clear that a multi-chamber bladder design by itself is not satisfactory to provide the kind of personalized comfort that has been sought after with inflatable bladder technology. One issue with previous attempts to provide support that conforms to the rider, including inflatable bladders as well as standard cushioning materials, is the fact that most designs are based on the same technology that is used for cushions that are optimized more for static conditions, such as cushions used for chairs or beds. In static conditions, there is no repeated pounding of the person's body against the cushioning material. More and more bicycle frames that are designed for off-road use take the dynamics of the road conditions into account in the design of the frame, and these frame designs include structural supports that are seen in other dynamic systems, like automotive vehicles and even aircraft, such as shock absorbers and designed frame deflection. However, unlike automotive vehicles and aircraft, where the pilots and drivers remain in a near steady-state seated position, a bike rider creates their own dynamics relative to the seat as they switch their power stroke from one leg to the other. Given this understanding of the combined problem of dynamics and personal comfort, it becomes more clear that the bladder designs that have typically been used for static seating arrangements could not possibly be satisfactory for a problem in which the particular bone structure of rider impacts the dynamics of the power stroke and the corresponding optimal support required from the seat.

Accordingly, there remains a need for an optimized cushion which provides the support that is required from the seat as a rider switches the power stroke from one leg to the other and which accounts for variations in personal anatomy.

SUMMARY OF THE INVENTION

The cushioning device of the present invention solves the painful problem of seated activities with personalized comfort provided over extended periods of riding, including the dynamic activity of cycling the power stroke from one leg to the other. Accordingly, the inventive cushioning device allows personalized adjustment of softness/firmness of a bladder formed inside or positioned on a seat and can also account for variations in personal anatomy by changing the configurations of multiple chambers in the bladder as well as changing the constriction between the chambers in the bladder.

The components of the cushioning device are uniquely integrated to enable a person to find their individual comfort level. The inventive cushioning device can also be used on other seats, and is particularly suited for use on seats in which the user is engaged in an activity that requires a cyclical movement of the legs or adjustment in the seat such as stationary biking (e.g., Spinning), rowing, horseback riding, and numerous other seated activities.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIGS. 1A, 1B, 1C and 1D are a top view, a side view, a back view and a front view of the invention, respectively.

FIGS. 2A and 2B are top views of alternative chamber configurations according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 3A:
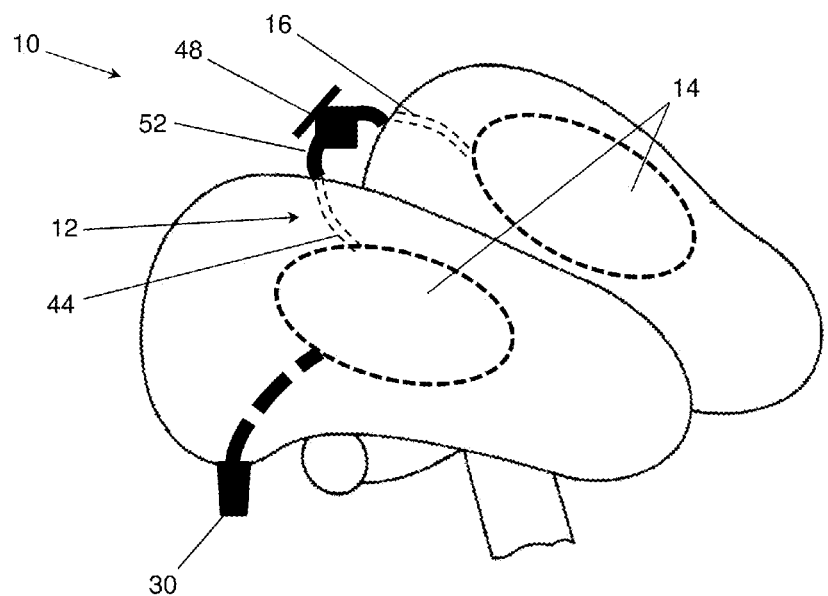
FIGS. 3A and 3B are isometric views of alternative constriction mechanisms according to the present invention.
Figure 3B:
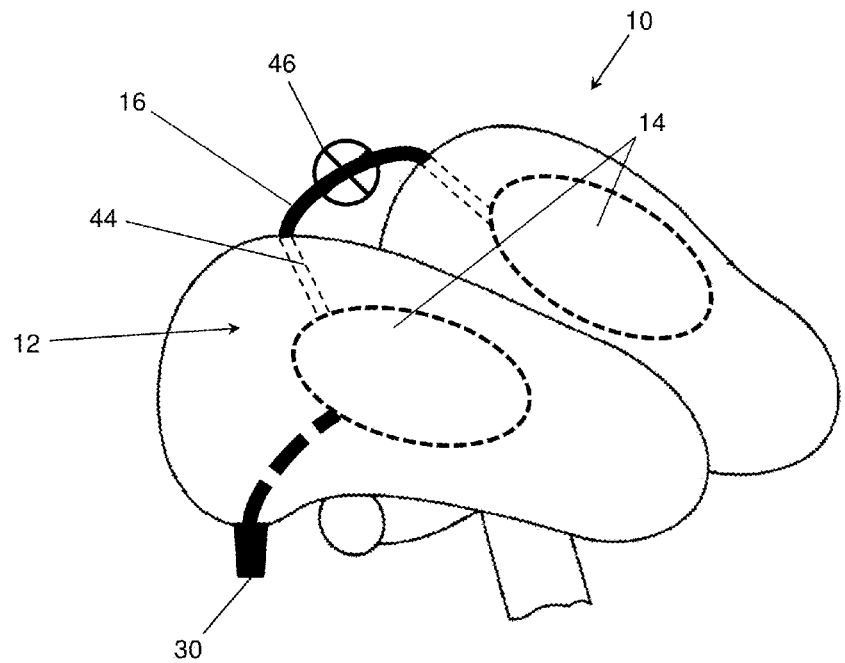
Figure 4:
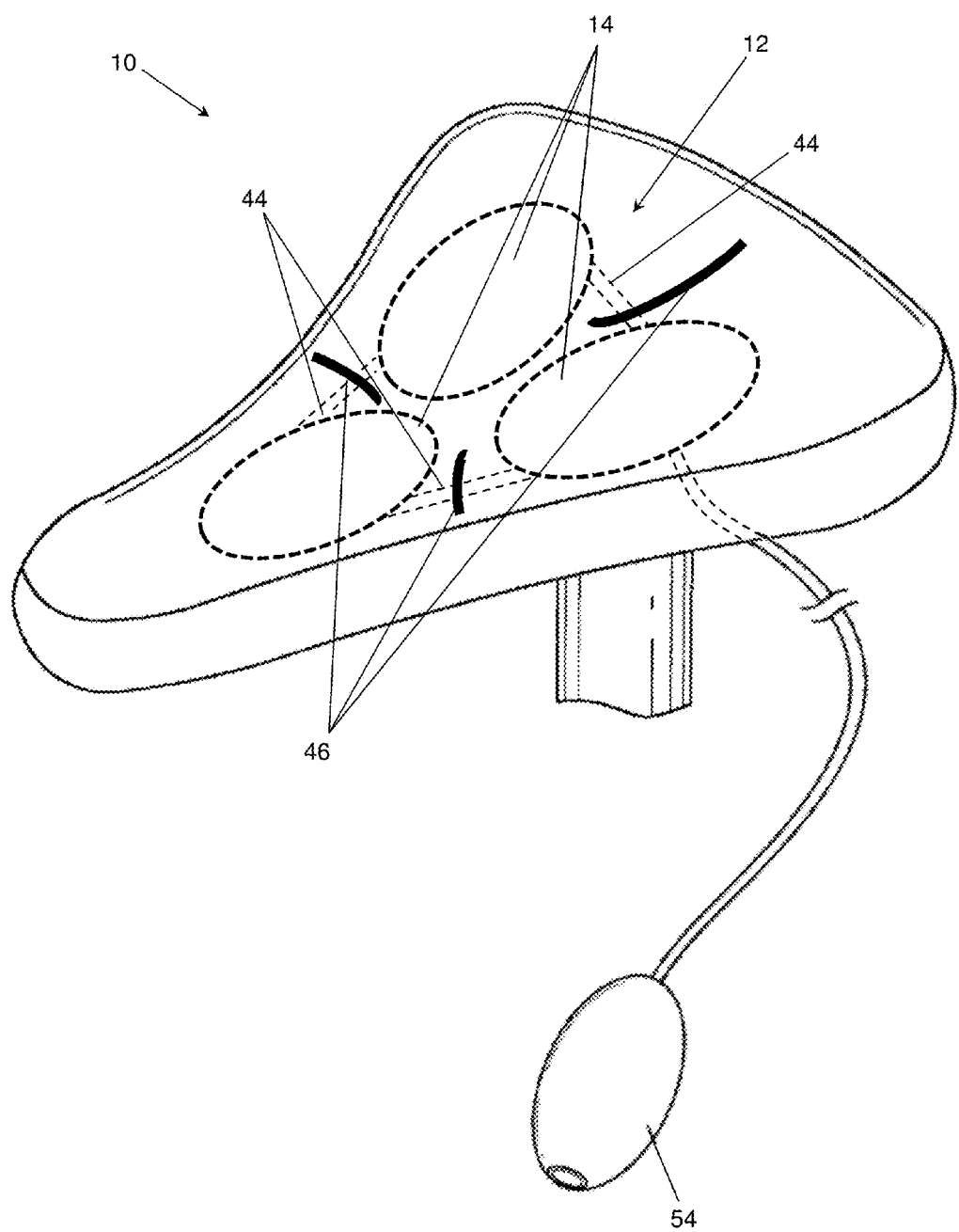
FIG. 4 is an isometric view of an alternative chamber configuration and an alternative constriction mechanism according to the present invention.

Most generally, as shown in FIGS. 1-4, the cushion 10 for a seat 100 has one or more sealed bladders 12 having an interior portion 22, an exterior portion 24 and a volume 26. There are multiple chambers 14 in the interior potion of the sealed bladder, a fluid communication path 16 between the chambers, and a variable constriction 18 in the fluid communication path between the chambers. The sealed bladder preferably includes a filling valve 30 on the exterior portion so that a fluid such as air can be pumped into the interior portion to vary the steady state pressure of the bladder. Although ambient air is the preferred fluid medium for the present invention, it is possible that an inert gas or a liquid may also be used. The bladder can be positioned on an existing seat 100 as shown in FIGS. 1 and 2 or can be incorporated into an integral seat design as shown in FIGS. 3 and 4. When the cushion 10 is added to an existing seat 100, a seat cover 50 can be used over the sealed bladder 12 to provide a more finished appearance.

As particularly shown in FIGS. 2A and 2B, even for an identically shaped sealed bladder 12 that is similarly positioned on a seat 100, the chambers 14a, 14b, 14c can be arranged with variable configurations 20 with a different arrangement and number of chambers. As explained below, different arrangements of the strap fasteners 32, 34 can create the variations in the configuration of the chambers 14 and can also vary the constriction 18 in the fluid communication path 16 between the chambers 14. For example, the straps 34 can form the triangle-shaped configuration 20' in FIG. 2A or the star-shaped configuration 20" in FIG. 2B as variable configurations 20 of the same bladder in the same position on the same seat. The interior portion of the bladder in these configurations has approximately the same volume, but the arrangement of the chambers varies. The triangle-shaped configuration divides the volume approximately equally between each of the chambers 14a, 14b, 14c, but the star-shaped configuration divides the volume so that so that at least one of the chambers 14b has a larger volume than other chambers 14a', 14a", 14c', 14c".

In each of these configurations, the variation in the tension 40 on the straps 34 allows for the selectable constriction 18 which determines how the airflow 28 is restricted between the chambers. For example, a looser fit of the straps 34 with lesser tension 40 on the straps 34 would allow air to more freely travel between the chambers while a tighter fit would be more restrictive of the airflow between the chambers respectively producing a higher flow rate 28' and a lower flow rate 28". The straps 34 actually function with the sealed bladder 12 to form a type of valve 46, namely a pinch valve 48.

The straps 34 are held in place with anchors 36 and fasteners 32. For example, an upper anchor 36a and a lower anchor 36b may be used as shown in FIGS. 1 and 2. The straps 34 are radially spaced from each other around the circumference of the bladder 12 and longitudinally extend over the bladders' exterior portion between the anchors 36 to form the chambers 14 in the interior portion as well as the fluid communication paths 16. The fluid communication paths are restricted by a pinch valve 48 that is varied according to the tension 40 of the straps 34 that are pulled over the bladder; accordingly, the straps define the fluid communication paths as well as the variable constriction and the configuration of the chambers. As explained above with respect to FIGS. 2A and 2B, the straps have alternate fixation paths between the anchors that produce the chambers' variable configurations. Accordingly, the straps not only allow for a variable configuration of the bladder/chamber, but the straps also provide the rider with the ability to vary the constriction of the passageways between the chambers.

It will be appreciated that configurations other than the triangle-shaped configuration and the star-shaped configuration can be created and bladders with other shapes can be uses. Even with the ring-shaped bladder shown in FIGS. 1 and 2, a figure-8 configuration could be produced, and this configuration may be secured to the seat in a side-to-side arrangement or a front-to-rear arrangement. The chambers can also be in fluid communication with each other through a tube 44. Such chambers 14 may be situated on a seat as generally described above or may be integrally incorporated into the design of a seat as shown in FIGS. 3 and 4.

As shown in FIGS. 3A and 3B, it is possible to incorporate the bladder chambers 14 into a seat 100 with a tube 44 that is external to the seat which also has an external valve connected to the external portion of the tube. FIG. 4 shows an example where tubes 44 may remain inside the seat with the chambers 14, but a pinch valve strap 46 extends out of the bottom of the seat or out from the periphery of the seat so that a rider can adjust the tension on the strap and control the flow rate through the tubes. In FIG. 3A, a pinch valve 48 is shown connected to the pliable section 52 of the tube 44 that is in external portion. It will also be appreciated that some tube designs may be more rigid and could have any type of variable flow rate valve that the rider uses to set the variable constriction, such as generally shown in FIG. 3B. This adjustment of the valve can be done by a knob or a standard bicycle tool that adjusts the valve, depending on the type of valve which could be a ball valve, a butterfly valve, a gate valve, a needle valve, the pinch valve and any other valve that would permit a variable selection of flow rates through the valve.

As particularly shown in FIG. 4, the straps 46 extend over a secured section of the tube 44. In such a case, the tube is preferably formed from a pliable material, and the strap has a fastener that varies the tension in the strap. The tension variation varies a deformation in the secured section of the pliable tube and provides the variable constriction.

Other known features of pneumatic cushions could also be incorporated into one or more of the designs described above. For example, the cushion could use a self-inflating bladder that has a resilient material which defines the volume for air at ambient conditions when the external valve is open or that uses the body weight of the rider to maintain the pressure and could also incorporate a variable-pressure check valve that would prevent the bladder from becoming over-inflated and that the rider could use to set the desired pressure within the system. Of course, a rider could still have variations in the constriction between the chambers, but the overall pressure could be set by a check-valve. The bladder may be inflated by a separate pump or by a bulb pump 54 that is integrated into the cushion system as shown in FIG. 4.

Several features and benefits of the inventive cushioning device are listed in the tables below.

| Features |
|---|
| Adjustable (male/female; height/weight; personalize desired comfort (i.e., softness) level) |
| Adaptable (all types (smooth/rough) terrain) |
| Anatomically Friendly |
| (minimize the dreaded genitilia/perineum effects such as Pudendal Nerve Entrapment, Impotence, Yeast Infections, Ischial bursitis (i.e., "pain-in-the-butt"), etc.). Neither Male nor Female is immune from some of these aliments/conditions. |

| Benefits |
|---|
| Perceived comfort Adjustable to the specific individual |
| Adaptable to different terrains and riding conditions |
| Interchangeable/Adapatable to different bicycles |
| Anatomically Friendly |
| Low cost to manufacture |
| Easily installed to an existing seat or seat base |
| Sans electronic or mechanical devices |
| Easy to adjust firmness |
| Separate Seat/Cushioning Cover designed to fit the variability of the level of firmness. |
| Increasing or decreasing the number of chambers is easily done by either increasing or decreasing the number of fastening straps and/or |

| Benefits |
|---|
| reconfiguring the fastening straps as the fastening straps segment/divided the bladder. |
| The changing of pressures between and among the chambers within the bladders thru the natural movement of the individual sitting on the cushion. |
| Pliability of the bladder allows for continuous comfort regardless of the ambient temperature. |
| All cushioning device components moisture resistant |
| Single Chamber cushioning devices do not allow for changing of pressure |
| Independent Multi-chambered cushioning devices do not allow for the cushioning medium to move between and among the chambers. |
| Cushioning medium can be air, inert gas, or liquid such as water.. |
| Bladder construction of Halogenated isobutylene-co-alkylstyrene polymer, preferably halogenated isobutylene-co-methylstyrene polymer, even more preferably brominated isobutylene-co-paramethylstyrene polymer (BIMS) and blends with a second rubber is preferred |
| Bladder inflation/deflation valve either Schrader or Presta. |
| Fastening straps can be constructed of either flexible (elastomeric) (i.e., Bungee Cord) or rigid materials. Both ends of each fastening strap has a hook, clip or other connector/fastener. For example, Bungee cords typically comprise a stretchable cord and a hook fastened at either end. |

The components of the cushion 10 as described above with reference to FIGS. 1 and 2 are generally described below along with a method of assembling and operating the cushioning device. The bladder 12 is flexible with both reflection and deflection characteristics. The filling valve 30 is preferably self-closing, such as a biased closed Schrader valve or Presta valve that are commonly used for bicycle tire tubes. The fastening straps 34 can be elastic or inelastic and are sized according to their length and width and preferably include clips, hooks or other fasteners or connectors 42 on each end. The anchor rings 36 are preferably made of steel with an anti-rusting finish. The cover is preferably made of moisture resistant, stretchable material. There may be an optional air hose extension 56 for larger seat profiles.

An existing seat maybe used as the base for the cushion device according to the present invention. Remove the seat from bicycle with the seat stem 110 attached to the seat 100. Place the seat stem 110 through the lower anchoring ring 36b. Remount the seat and seat stem on the bicycle. Attach the firmness extension hose 56 to the filling valve 30 on the bladder 12. Center the deflated bladder 12 on top of the seat with valve facing down toward the top of the seat. The firmness extension hose should be between the deflated bladder and the top of the seat. Inflate the deflated bladder with a small amount of air through the firmness extension hose. Take one fastening strap 34 and thread it through the upper anchoring ring 36a which will be centered on the top 38 of the partially inflated bladder. Take another fastening strap 34 and also thread it through the upper anchoring ring 36a. Fasten the straps to the lower anchoring ring 36b using the hooks or other connectors 42 at the end of the straps. The anchoring straps can have fixation paths at 10 o'clock/7 o'clock for one strap and 2 o'clock/5 o'clock for the other strap although this can be varied depending on the preference of the rider and the type of seat on which the bladder is being fitted. When all of the straps are fastened to the respective lower anchoring ring, additional air pressure can be added to the bladder.

It may be noted that riders who have used other types of inflatable cushions may have a tendency to make the seat rock hard with the air pressure. This has two (2) inherent problems: (1) the potential to over-inflate the bladder which could result in the bladder bursting and (2) for personal comfort, rock hard firmness will not yield a very comfortable ride. Accordingly, it is preferred to gradually inflate the bladder to find the right personalized softness/firmness pressure for the type of riding a person wants to do. If the seat is too hard, air can be released through the inflation valve 30 just would be done for the tires on the bike.

When the seat is situated back on the bike, the enclosed cover 50 may also be placed on the seat. It is preferred that the firmness extension hose 56 should remain accessible on the bottom side of the seat.

Finding the preferred softness/firmness pressure is a 'trial & error' process. The personal comfort/mass-production maxim remains in place so variations based on particular riders can be expected. In addition to the seat cushion, riding comfort is also based on the height of the seat and the position of the handlebars, and all of these variations are based on the personal physical attributes of the rider. A key that characterizes the width of a person's ischium is provided in the table below.

| Key Measurement For Ischium (Sit Bones) | |
| --- | --- |
| "Narrow" | <100 mm (or 4 inches) |
| "Medium" | >100 mm & <130 mm (or between 4 & 5⅛ inches) |
| "Wide" | >130 mm (or 5⅛ inches) |

Seat sizes can be estimated through measurement. However, personalized comfort sizes are personal, regardless of what the measurements might otherwise suggest.

Once the bladder 12 has been secured to the seat 100 with the fastening straps 34 and the two (2) anchor rings 36, inflating the bladder with the cushioning medium begins with the injection of the cushioning medium. The results of the process of inflating the bladder are summarized in the steps provided below.

As pressure in the bladder is increased, the bladder begins to expand as would a balloon would if it were being filled with water or air. Resistance of portions of the bladder begin to occur where the fastening straps cross the top of the bladder. As the bladder fills, compression of the walls of the bladder begin to contort the shape of the fastening straps. Since the bladder walls are more pliable than the rigid fastening straps, orifices begin to form. The formation of the chambers and orifices is due to the increasing pressure in the bladder as it is inflated, the increased tightening of the fastening straps or a combination of both. With the seat cover secured, the weight of the person sitting on the seat (i.e., bladder) results in additional static downward pressure on the bladder. Sitting "still" on the seat permits the pressures within each chamber to equalize (steady-state pressure).

Pressures within the chambers begin to change with shifting of the weight of the person sitting on the seat. Movement such as the cyclical pedaling motion of a bicycle causes the weight of the person to shift in various planes relative to the plane of the seat and bladder. Shifting of weight forces the cushion medium to exit one chamber and enter another chamber. The movement of the cushioning medium results in the chambers becoming firmer (i.e., harder) or becoming less firm (i.e., softer). As long as movement of the person continues, there will be a constant changing of pressures between or among the chambers.

Rider movement results in the interchange of pressures through variable-sized orifices between variable-displacement chambers. The number and size of the chambers can be varied according to a desired seating configuration. The orifice size and shape can be changed using the variable constriction and may also change according to the weight, posture, and movement of the person sitting on the device. Changing the number of chambers is dependent upon the desired fastening configuration which is also dependent on the end-use application. This cushioning device will work for both retrofitting existing seats and for new seats.

As described above, the bladder can be separate from both the cover and the seat base or it can be integral with the seat. The anchoring mechanism of bladder to the seat base can be fastening straps with clips on their ends or any other mechanism that holds multiple chambers on or in the seat and tubes between the chambers. When using fastening straps, freestanding anchoring rings that float can accommodate different inflation pressures and the different configurations produced by various arrangements of the fastening straps. When the bladder is separate from the seat, the number of bladder chambers can be changed as desired and can be easily interchangeable between bikes.

It will be appreciated that the combination of multiple chambers which can be changed and varying of pressures within the chambers enables an anatomically-friendly configuration to accommodate both genders. The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A cushion for a seat, comprising:
   a sealed bladder having an interior portion and an exterior portion;
   a plurality of bladder sections in said interior portion of said sealed bladder formed by a set of fasteners;
   a fluid communication path between said plurality of bladder sections;
   a variable constriction in said fluid communication path between said plurality of bladder sections, wherein said variable constriction has a first selectable constriction and a second selectable constriction, wherein said first selectable constriction and said second selectable constriction respectively correspond with a first flow rate and a second flow rate through said fluid communication path and wherein said second flow rate is greater than said first flow rate;
   a seat stem; and
   the set of fasteners holding said sealed bladder on the seat, wherein said set of fasteners are comprised of a plurality of straps, an upper anchor and a lower anchor, wherein said upper anchor is positioned at a top of said exterior portion of said sealed bladder, wherein said lower anchor is positioned around said seat stem, and wherein said straps are radially spaced around said exterior of said sealed bladder and longitudinally extend over said exterior portion of said sealed bladder and the seat and are connected to said lower anchor and said upper anchor.

2. The cushion of claim 1, wherein said sealed bladder further comprises a filling valve on said exterior portion through which a fluid is pumped into said interior portion.

3. The cushion of claim 1, further comprising the set of fasteners holding said sealed bladder on the seat, wherein a first arrangement of said fasteners around said sealed bladder provides a first configuration of said bladder sections on the seat and wherein a second arrangement of said fasteners around said sealed bladder provides a second configuration of said bladder sections on the seat.

4. The cushion of claim 3, wherein said interior portion of said sealed bladder has a volume, wherein a first selectable configuration divides said volume approximately equally between each of said bladder sections and wherein a second selectable configuration divides said volume with at least one of said bladder sections having a larger volume than another of said bladder sections.

5. The cushion of claim 1, further comprising a plurality of fluid communication paths.

6. The cushion of claim 5, wherein a tension in said straps around said exterior of said sealed bladder form said fluid communication path between said plurality of bladder sections in said interior portion and a selectable amount of said tension produces said variable constriction in each of said fluid communication paths, wherein a selective tightening of said straps between said lower anchor and said upper anchor produces said selectable amount of said tension.

7. The cushion of claim 6, wherein said straps are further comprised of a set of connectors, wherein said connectors cooperate with said respective straps to produce said selectable amount of tension.

8. The cushion of claim 5, wherein said straps have alternative sets of radial fixation paths between said lower anchor and said upper anchor, and wherein said alternate fixation paths produce a variable configuration of said bladder sections.

9. The cushion of claim 1, further comprising a seat cover over said sealed bladder.

10. A cushion for a seat, comprising:
   a sealed bladder positioned on the seat, wherein said sealed bladder has a volume in an interior portion and a filling valve between an exterior portion and said interior portion;
   an upper anchor positioned at a top of said exterior portion of said sealed bladder;
   a plurality of straps longitudinally extending from said upper anchor around said exterior portion of said sealed bladder, wherein said straps hold said sealed bladder on the seat, and wherein said straps in a tightened configuration serve as a pinch valve between a plurality of bladder sections in said interior portion of said sealed bladder; and
   a fluid communication path between said plurality of bladder sections.

11. The cushion of claim 10, wherein a first arranoement of said straps around said sealed bladder provides a first configuration of said bladder sections on the seat and wherein a second arrangement of said fasteners around said sealed bladder provides a second configuration of said bladder sections on the seat.

12. The cushion of claim 10, further comprising a variable constriction in said fluid communication path between said plurality of bladder sections according to a variable tightness of said straps, wherein said variable constriction has a first selectable constriction and a second selectable constriction, wherein said first selectable constriction and said second selectable constriction respectively correspond with a first flow rate and a second flow rate through said fluid communication path and wherein said second flow rate is greater than said first flow rate.

13. The cushion of claim 12, further comprising a lower anchor positioned below the seat, wherein said straps are radially spaced around said exterior of said sealed bladder and longitudinally extend over the seat and are connected to said lower anchor.

14. The cushion of claim 13, wherein said straps have alternative sets of radial fixation paths between said lower anchor and said upper anchor, wherein said alternate fixation paths produce said variable configuration of said bladder sections, and wherein said straps function as a pinch valve between said plurality of bladder sections and produce said variable constriction in said fluid communication path.

15. A cushion for a seat, comprising:
   a sealed bladder positioned on the seat, wherein said sealed bladder has a volume in an interior portion and a filling valve between an exterior portion and said interior portion;
   an upper anchor positioned at a top of said exterior portion of said sealed bladder;
   a plurality of straps longitudinally extending from said upper anchor around said exterior portion of said sealed bladder, wherein said straps hold said sealed bladder on the seat and form a plurality of bladder sections in said interior portion of said sealed bladder; and
   a plurality of fluid communication paths between said plurality of bladder sections, wherein said straps serve as a pinch valve in each of said fluid communication paths between said plurality of bladder sections, wherein said pinch valve has a first tightness of said straps with a first selectable constriction and a second tightness of said straps with a second selectable constriction, wherein said first selectable constriction and said second selectable constriction respectively correspond with a first flow rate and a second flow rate through said fluid communication path and wherein said first tightness is greater than said second tightness and said second flow rate is greater than said first flow rate.

16. The cushion of claim 15, further comprising a seat stem and a lower anchor, wherein said lower anchor is positioned around said seat stem, and wherein said straps are radially spaced around said exterior of said sealed bladder and are connected to said lower anchor under the seat.

17. The cushion of claim 16, wherein said straps have alternative sets of radial fixation paths between said lower anchor and said upper anchor, and wherein said alternate fixation paths produce variable configuration of said bladder sections.

* * * * *